United States Patent
Inglis et al.

(10) Patent No.: US 7,577,738 B1
(45) Date of Patent: Aug. 18, 2009

(54) METHOD AND APPARATUS USING VOICE AND DATA ATTRIBUTES FOR PROBE REGISTRATION AND NETWORK MONITORING SYSTEMS

(75) Inventors: Nevill John Inglis, Castle Hill (AU); Muneyb Minhazuddin, Quakers Hill (AU); Peter D. Runcie, Bilgola Plateau (AU)

(73) Assignee: Avaya Inc., Basking Ridge, NJ (US)

( * ) Notice: Subject to any disclaimer, the term of this patent is extended or adjusted under 35 U.S.C. 154(b) by 710 days.

(21) Appl. No.: 11/195,070

(22) Filed: Aug. 1, 2005

(51) Int. Cl.
*G06F 15/173* (2006.01)
*G06F 11/00* (2006.01)
*H04L 12/28* (2006.01)

(52) U.S. Cl. ................... 709/224; 709/238; 714/4; 714/736; 370/254; 370/395.52

(58) Field of Classification Search .............. None
See application file for complete search history.

(56) References Cited

U.S. PATENT DOCUMENTS

| 5,410,551 | A | * | 4/1995 | Edwards et al. ............. 714/736 |
| 7,222,255 | B1 | * | 5/2007 | Claessens et al. ............. 714/4 |
| 7,260,645 | B2 | * | 8/2007 | Bays ........................ 709/238 |
| 2005/0053016 | A1 | * | 3/2005 | Kawai et al. ................ 370/254 |
| 2006/0274760 | A1 | * | 12/2006 | Loher .................... 370/395.52 |

* cited by examiner

*Primary Examiner*—Wen-Tai Lin
(74) *Attorney, Agent, or Firm*—Sheridan Ross P.C.

(57) ABSTRACT

The present invention is directed to network monitoring systems. Test probes available for use in connection with network monitoring are registered. As part of the registration of test probes, information related to the type of device implemented by each test probe is also collected. Information related to the network or subnetwork with which each device is associated may also be collected. The collected information may therefore comprise system topology discovery. In addition, the collected information may be used to select distributions of device types in order to implement particular test schemes or protocols.

31 Claims, 4 Drawing Sheets

METHOD AND APPARATUS USING VOICE AND DATA ATTRIBUTES FOR PROBE REGISTRATION AND NETWORK MONITORING SYSTEMS

FIELD OF THE INVENTION

The present invention is generally related to network monitoring systems.

BACKGROUND OF THE INVENTION

Network performance monitoring systems often use distributed active "probes" that inject traffic into the network. Probes may be either dedicated hardware devices or software running on devices or entities in the network, such as personal computers, telephones and gateways. The software running on a device functioning as a probe to generate test traffic is known as a "test plug."

Using the entire population of possible probes is usually unnecessary, as during a typical network performance test, statistical information is being collected. Furthermore, using the entire population of possible probes has the potential of overloading the network. Accordingly, network performance monitoring systems often need to select a subset of all possible probes as the active set.

The selection of probes has generally been done through manual configuration or on a first-come, first-served basis. However, using such techniques, it is difficult or impossible to ensure that the set of active probes is representative of the total population of devices or entities on the network. In particular, characteristics of devices that may not be represented or that may not be represented in a realistic and/or desired proportion to all devices on the network include device type, network (or subnetwork) location and traffic parameters.

More particularly, techniques for use in connection with network performance monitoring have used the Internet protocol (IP) address to identify probes. Furthermore, simple network management protocol (SNMP) has been used to collect data from the probes. However, in order to monitor a converged network, where the network devices have more than one identity, the IP address by itself is not sufficient to identify the network probes. In particular, in a converged network, probes may have both an IP address for use in connection with the data network domain and an extension number or multimedia identity in a telephony or multimedia domain.

SUMMARY OF THE INVENTION

Embodiments of the present invention are directed to solving these and other problems and disadvantages of the prior art. According to embodiments of the present invention, network monitoring is performed in view of a number of different device attributes. Accordingly, probe sets for use in connection with network performance monitoring can be designed that are a representative sample of devices or entities connected to the network. Furthermore, embodiments of the present invention permit a network topology to be developed, which can be used to facilitate the creation of a representative test probe distribution.

In accordance with further embodiments of the present invention, a number of different device attributes are used in creating a converged network identifier. Examples of device attributes that may be used to create the converged network identifier include data network attributes, such as IP network address or mask, next hop, default gateway, or VLAN network address or mask. Examples of voice and voice over Internet protocol network attributes that can be used in creating a converged network identifier include extension number, network region, default gateway, or extension range of the device.

In accordance with still other embodiments of the present invention, various network performance monitoring parameters can be selected for use in creating probe sets and test routines and conditions. In accordance with additional embodiments of the present invention, the selection of a probe set for use in connection with a network performance test can be made with reference to network topology information obtained through the registration of network devices and the assignment of a converged network identifier as described herein to those devices. For example, in a converged network, the population of network devices comprising telephony endpoints can be determined through the registration of network devices and the determination of a converged network identifier for each of those devices.

Additional features and advantages of embodiments of the present invention will become more readily apparent from the following description, particularly when taken together with the accompanying drawings.

DETAILED DESCRIPTION

Figure 1:
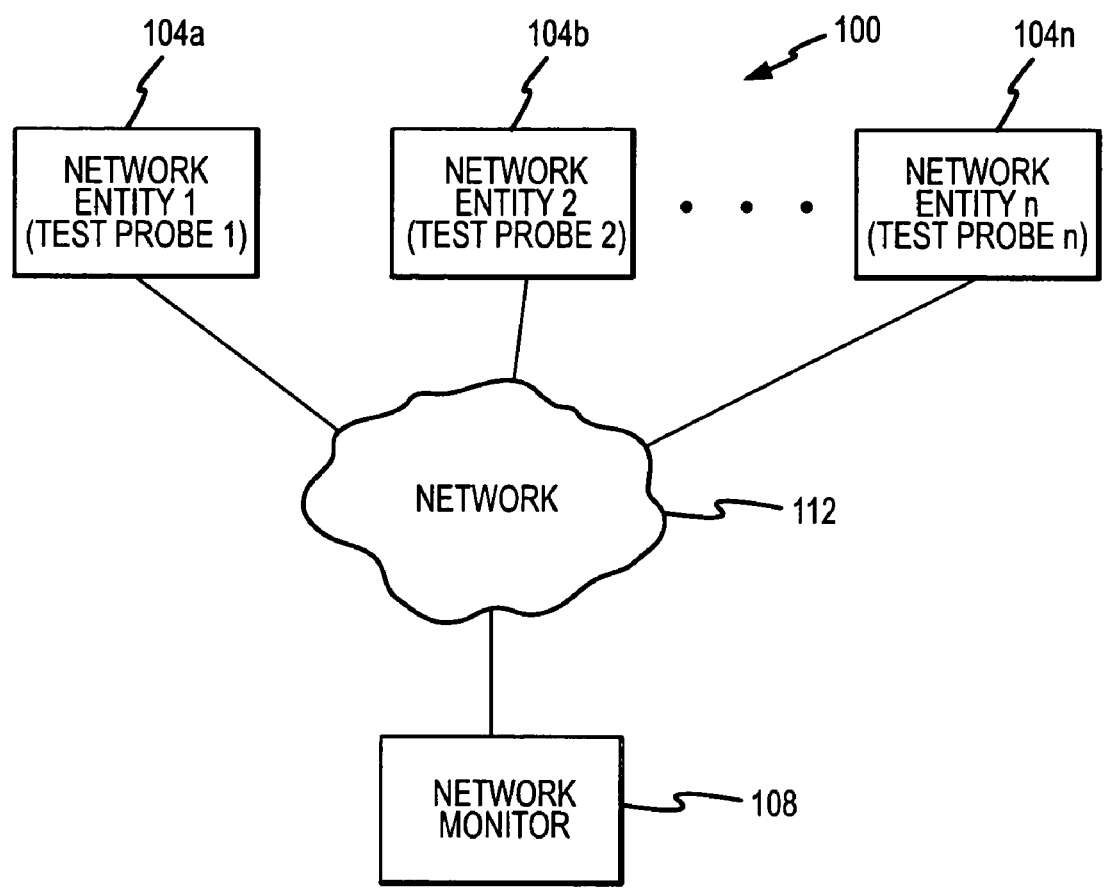
FIG. 1 is a block diagram of a network incorporating a network performance monitoring system in accordance with embodiments of the present invention.

FIG. 1 is a block diagram of a network incorporating a network performance monitoring system 100 in accordance with embodiments of the present invention. In general, the system 100 includes a number of network entities 104 comprising test probes. Examples of network entities 104 include personal computers, Internet protocol telephones, gateways or other devices included in the system 100 running software (at least while in a test mode) comprising a test plug. Although three network entities 104a-104n are illustrated in FIG. 1, it can be appreciated that the number of network entities 104 that can be associated with the system 100 is not limited to any particular number, apart of course from any particular limitations that may be imposed by the constraints of the network itself.

The system 100 additionally includes a network monitor or analyzer 108. As described in greater detail elsewhere herein, the network monitor 108 generally collects information related to network entities 104 comprising test probes, the execution of performance testing, and the collection of results regarding such testing. As can be appreciated by one of skill in the art, the network monitor 108 may further comprise a particular type or instance of a network entity.

The various network entities 104 and the network monitor 108 are interconnected by a network 112, which provides the interconnections between the entities 104 and the network monitor 108, and according to which the protocols used for communications between such network entities 104 themselves, and/or with the network monitor 108, are defined. Furthermore, embodiments of the present invention may be applied in connection with networks 112 that are associated with and carry traffic associated with the exchange of data between network entities 104 using different transmission protocols, including the real time protocol (RTP), for example in connection with voice over Internet protocol (VoIP) communications. Examples of network 112 types include wireline or wireless Ethernet and other networks used for transferring data according to various Internet protocols.

Figure 2:
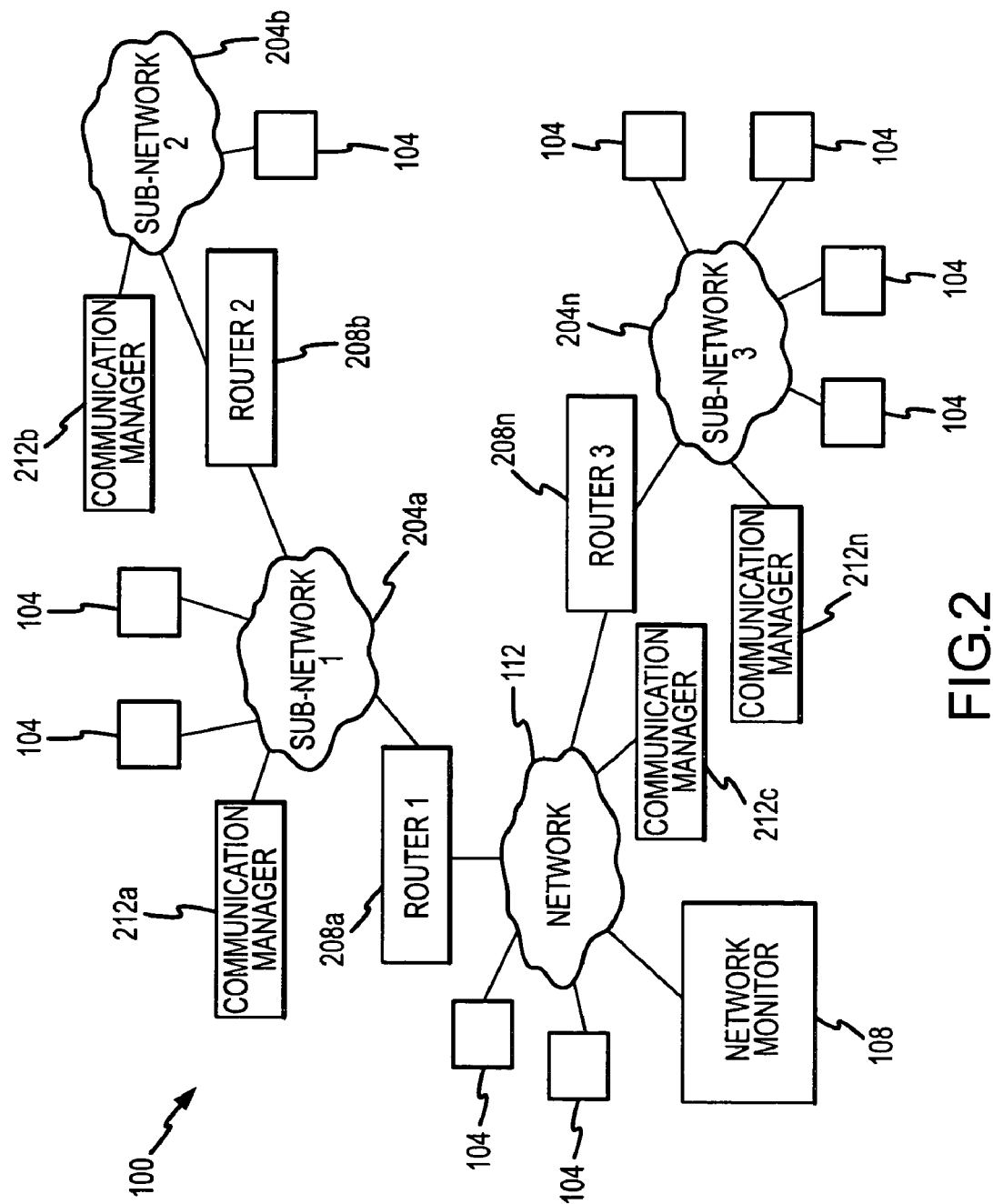
FIG. 2 is a block diagram of a network comprising a number of subnetworks and including a network performance monitoring system in accordance with embodiments of the present invention.

With reference now to FIG. 2, a network incorporating a performance monitoring system 100 in accordance with additional embodiments of the present invention is illustrated. In general, the system 100 of FIG. 2 differs from the system 100 of FIG. 1 in that it includes a number of subnetworks 204, in addition to the central network 112. As can be appreciated by one of skill in the art, the various subnetworks 204 may be interconnected to the central network 112, or to one another, through routers 208. In general, each network 112 or subnetwork 204 is associated with one or more network entities 104. Although three subnetworks 204a, 204b and 204c and associated routers 208a, 208b and 208n are shown in FIG. 2, it should be appreciated that embodiments of the present invention are not limited to any particular number of subnetworks 204 and routers 208.

Each network or subnetwork may (but need not be) additionally be associated with a communication manager 212. In general, a communication manager 212 may comprise a particular type of network entity. More particularly, a communication manager 212 may coordinate particular functions of a network 112 or subnetwork 204 comprising a converged network. Such functions may include the control and organization of telephony functions, for example where at least some network entities 104 on the same network 112 or subnetwork 204 as the communication manager 212 comprise telephony endpoints. In accordance with still other embodiments of the present invention, a communication manager 212 may define network regions. Although a number of communication managers 212a, 212b, 212c and 212n are shown in FIG. 2, such that one communication manager 212 is associated with each network 112 and subnetwork 204, it should be appreciated that a communication manager 212 is not required.

As can be appreciated by one of skill in the art, a network entity 104 associated with an IP network 112, 204, is associated with an IP address and a network mask. Furthermore, in association with a converged network 112, 204, a network entity 104 may be associated with another type of address. For instance, a network entity 104 may be associated with a telephone number or extension. In general, an IP address uniquely identifies a network entity 104, while the network mask allows the network or subnetwork with which the network entity 104 is associated to be determined. Furthermore, each network entity 104 is typically associated with a network address that can be determined from the IP address and network mask for each network entity 104. The network address can be used to determine the network region to which an entity 104 belongs. Accordingly, information regarding the location (e.g., the network 112 or subnetwork 204) with which an entity 104 is associated can be collected. Furthermore, ranges of addresses other than IP addresses, such as session initiation protocol (SIP) addresses, ENUM addresses and phone numbers, can also be used to characterize a network entity 104.

In a system 100 comprising multiple networks 112 and/or subnetworks 204, distinctions or boundaries between different networks 112 and subnetworks 204 may be defined by routers 208. Network entities 104 comprising test probes may then attempt to register with a network monitor 108 across networks 112 or subnetworks 204, as necessary, as described in greater detail elsewhere herein. Furthermore, although a single network monitor 108 is illustrated in FIG. 2, it can be appreciated that a number of network monitors 108 may operate cooperatively to collect network topology information and/or conduct performance testing.

Figure 3:
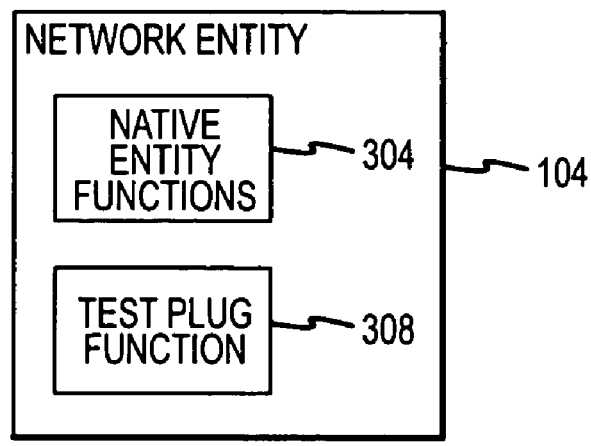
FIG. 3 is a functional block diagram of a network entity or device in accordance with embodiments of the present invention.

With reference now to FIG. 3, functional components of a network entity 104 comprising a test probe in accordance with embodiments of the present invention are illustrated. In general, a network entity 104 comprising a test probe may include native entity functions 304 and a test plug function 308. Examples of native entity functions 304 include telephony functions, client computer functions, server computer functions, gateway functions, and/or any other function of a device comprising a network entity 104 that are or may be performed in connection with the normal cooperation of the network entity 104. A native entity function may define a device type for a network entity 104. Furthermore, a network entity 104 may have a number of native entity functions, and may therefore comprise more than one device type. The test plug function 308 may comprise software or firmware that can be executed by a network entity 104 to allow that network entity 104 to function as an active probe in connection with performance testing. Furthermore, the test plug function 308 may enable network topology information to be collected. Examples of network entities 104 comprising a test probe include client computers or server computers providing one or more functions, telephony or other communication system endpoints, gateways, routers, switches or any other device that can be operatively interconnected to a network 112 or subnetwork 204 and that can execute instructions to perform a test plug function 308. In addition, a network entity 104 comprising a dedicated test probe can be provided that includes a test plug function 308, but no native entity functions 304.

Figure 4:
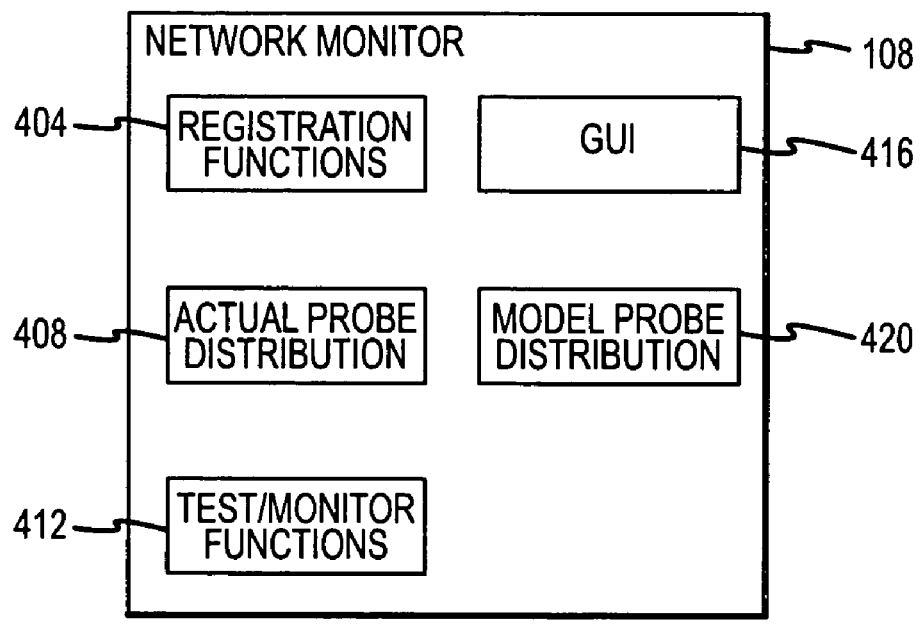
FIG. 4 is a functional block diagram of a network monitor in accordance with embodiments of the present invention.

With reference now to FIG. 4, functional components of a network monitor 108 in accordance with embodiments of the present invention are depicted. Such functions may include registration functions 404, which may operate in connection with the registration of network entities 104 comprising test probes and that therefore include or are capable of running test plug functions 308. An actual probe distribution function 408 may also be included for collecting or discovering network topology information, including information regarding the distribution of network entities 104 across networks 112 and/or subnetworks 204 monitored by the network monitor 108, and the native functions 308 or device types of such network entities 104. Test/monitor functions 412 are included for conducting network performance testing and collecting information related to the results of such testing. The test/monitor functions 412 in accordance with embodiments of the present invention may include the capability of controlling the population or set of network entities 104 included in a particular test to accurately reflect actual distributions of network entity 104 types. Alternatively or in addition, the test/monitor functions 412 may have the capability of controlling the network entities 104 functioning as test probes included in a particular performance test to simulate alternate distributions of network entity 104 types.

Additional functions that may be performed or provided by a network monitor 108 include a graphical user interface function 416 to allow an administrator or other user to interface with the network monitor 108, for example to control registration functions 404, review actual probe distribution 408 information, and control test/monitor functions 412. Furthermore, the graphical user interface 416 may allow an administrator to specify a model probe distribution 420 that can be used in connection with the performance of test/monitor functions 412 to select those network entities 104 that will serve as test probes in connection with a particular task.

In accordance with embodiments of the present invention, a network monitor 108 may comprise a single board computer interconnected to a network 112 or subnetwork 204. Accordingly, the various functions 404 to 420 of a network monitor 108 may be executed on a single board microprocessor. In accordance with further embodiments of the present invention, a network monitor 108 comprising a single board computer could be incorporated into another network device, such as a server or client computer. In accordance with still other embodiments of the present invention, the network monitor 108 functions 404-420 can be implemented in connection with software running on a network entity 104.

Figure 5:
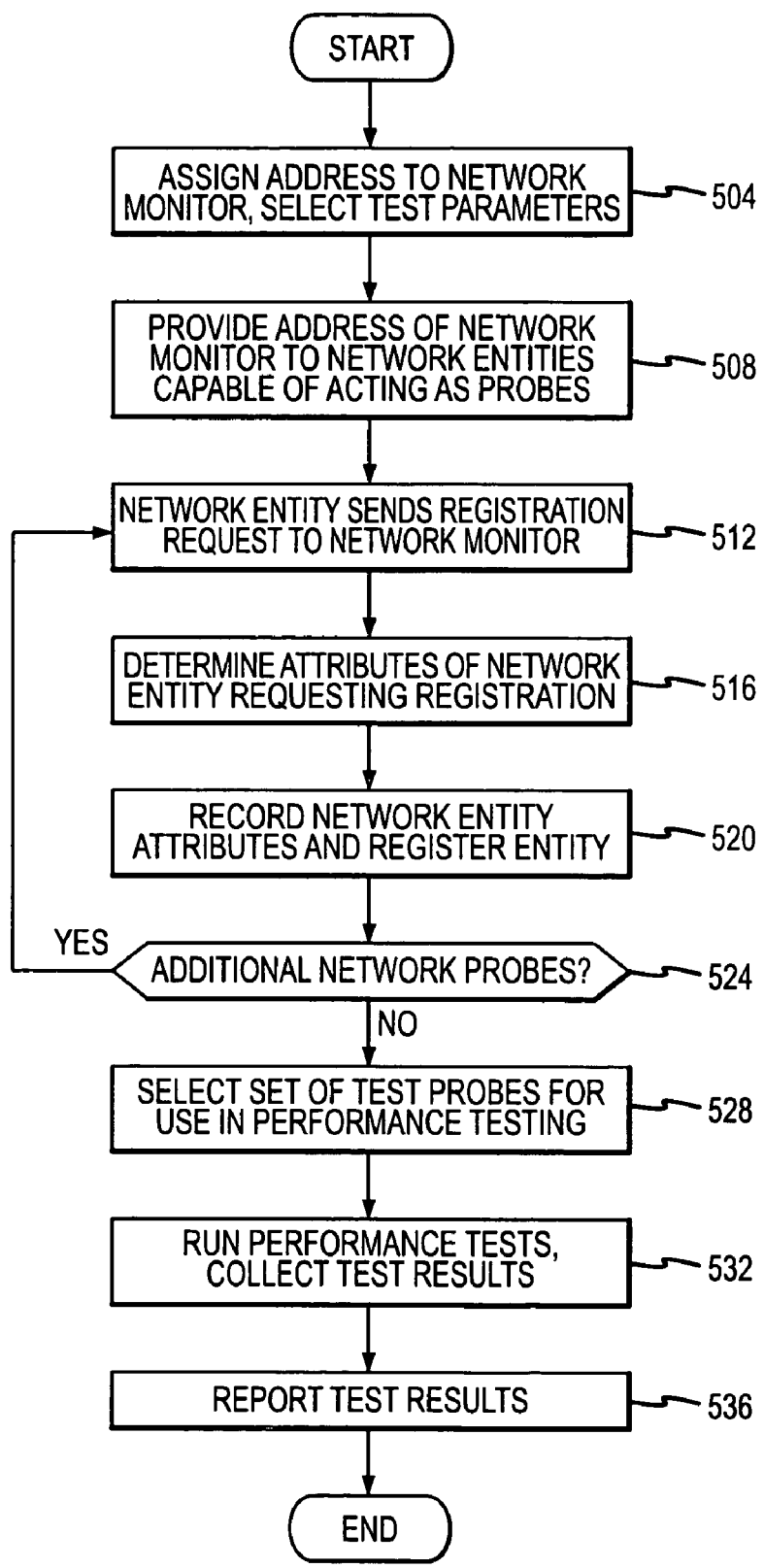
FIG. 5 is a flowchart illustrating aspects of the operation of a network performance monitoring system in accordance with embodiments of the present invention.

With reference now to FIG. 5, aspects of the operation of a system 100 in accordance with embodiments of the present invention are illustrated. Initially, an address is assigned to the network monitor 108, and test parameters are selected (step 504). The assignment of an address to the network monitor 108 may comprise assigning an Internet protocol address to the network monitor 108 to allow other network entities 104 to communicate with the network monitor 108. The selection of test parameters can comprise providing the network monitor 108 with network entity type distributions for use in connection with network testing, the selection of distributions mimicking actual distributions, the configuration of timing parameters, particular network performance tests to be performed, and/or test results analysis. The address of the network monitor 108 is then provided to network entities 104 capable of acting as test probes (i.e., to network entities 104 comprising a test plug function 308) (step 508). For example, the address of the network monitor 108 can be sent to network entities 104 comprising test probes that are listening on a particular port or socket. As a further example, the address of the network monitor 108 can be broadcast, at least within a selected sub-network or networks, and those network entities 104 that are capable of acting as test probes can respond with a registration request, while network entities that are not capable of performing a test plug function 308 can ignore the information regarding the address of the network monitor. As can be appreciated by one of skill in the art, test plug functions 308 may be built into network entities 104, for example by providing them with firmware or software for performing test plug functions 308, or by distributing test plug functions 308 to network entities 104 after such entities 104 have been connected to a network 112 or subnetwork 204.

After a network entity 104 having a test plug function 308 (i.e. a test probe) has been provided with the address of the network monitor 108, the network entity 104 will attempt to register with the network monitor 108 by sending a registration request to the network monitor 108 (step 512). As can be appreciated by one of skill in the art, those network entities 104 that are on the same network 112 or subnetwork 204 as the network monitor 108, and that are therefore a zero hop away from the network monitor 108, will tend to be registered with the network monitor 108 more quickly than remote network entities 104. Therefore, according to embodiments of the present invention, the discovery of network entities 104 through the receipt of registration requests is, according to embodiments of the present invention, allowed to continue even after the number of registration requests received by the network monitor 108 has exceeded the number of test probes that will be used in connection with the performance of a particular test protocol. That is, registration can continue to allow network entities that are on other networks 112 or subnetworks 204, and that are therefore one or more hops away from the network monitor 108, to register with the network monitor 108.

After receiving a registration request from a network entity 104, the network monitor 108 determines (or receives information related to) attributes of the network entity 104 requesting registration, and therefore determines (or is informed of) the type of device or entity 104 that is associated with each test probe (step 516). Determining the device type or attributes of a network entity 104 may comprise receiving the address associated with a network entity 104 and determining the different address types that may be associated with the network entity 104. Furthermore, determining the device type or attributes of a network entity 104 may comprise receiving the attributes of that entity as part of a registration request. For example, a network entity 104 having a test plug function 308 may compute a converged network identifier based on the network entity's 104 network attributes, and provide that identifier, which can identify information such as the subnet and/or device type associated with the network entity 104, to the network monitor 108. Therefore, in accordance with embodiments of the present invention, characteristics or attributes of network entities 104 can be cataloged using assigned identifiers. For example, a converged network identifier can be associated with each network entity 104. Furthermore, such a converged network identifier may comprise a number of individual identifiers. For example, in accordance with embodiments of the present invention, a converged network identifier may comprise a value indicating the subnetwork 204 that a network entity 104 is a part of and a subidentifier indicating a device type for the network entity 104. Determining the device type or attributes of a network entity comprising a test probe may further include determining the number of network hops of the network entity 104 from the network monitor 108. For example, a network entity 104 comprising a telephony endpoint, such as an IP telephone, may include data network attributes such as an IP network address and/or mask, and a next hop. Examples of the non-data network attributes of a network entity 104 comprising a telephony endpoint (or the voice and voice over Internet protocol (VoIP) network attributes) include extension number, network region, and default gateway. Examples of the data network attributes and voice and VoIP network attributes that may be associated with the different network entities 104 are summarized in Table 1.

TABLE 1

| Device Attribute (Type of Device) | Data Network Attributes | Voice and VoIP Network Attributes |
|---|---|---|
| IP Phone | IP Network Address/Mask, Next hop, VLAN | Extension number, Network Region, Default Gateway, Gatekeeper registered with |
| Media Gateway | IP Network Address/Mask, Next hop, Default Gateway, VLAN | Extension range, Network Region, Gatekeeper registered with, Media gateway type (e.g. H.248 or proprietary) |
| Secure Gateway | IP Network Address/Mask, | Default Gateway |

TABLE 1-continued

| Device Attribute (Type of Device) | Data Network Attributes | Voice and VoIP Network Attributes |
|---|---|---|
| Routers | Next hop, Default Gateway, VLAN IP Network Address. For each interface: Network Address/Mask, Next hop | Default Gateway |
| Layer 3 Switch | IP Network Address, For each VLAN: Network Address/Mask, Next hop | Default Gateway |

At step 520, the network entity attributes are recorded, and the network entity 104 is registered. Recording the network entity attributes and registering the entity may comprise recording a converged network identifier and an Internet protocol network address in memory associated with the network monitor 108. Alternatively, the network monitor 108 may reject the registration request of a network entity.

A determination may then be made as to whether additional network probes that have been provided with the address of the network monitor 108 remain to be registered. If additional network probes remain to be registered, the process may return to step 512. If no additional network probes remain to be registered, the process may proceed to step 528. As can be appreciated by one of skill in the art after consideration of the description provided herein, after all or substantially all of the network probes 104 have completed the registration process, information regarding the distribution of network entities 104 across networks 112 and subnetworks 204 included in a system 100 is available. Furthermore, information regarding the number and distribution of network entity 104 types is available. Accordingly, embodiments of the present invention provide a system 100 that allows for the collection or discovery of detailed network topology information, which can include information regarding the distribution of different network entity 104 types. The collected network topology information may further be used to create a map of the network topology. As can also be appreciated by one of skill in the art, the registration of network probes can be performed continuously, for example as the entities associated with the system 100 change.

At step 528, a set of network entities 104 comprising test probes for use in performance testing is selected. The test probes included in a set may be selected such that the distribution of the selected test probes models the actual distribution of network entities across the system 100 in the network 112 or subnetwork 204 with which the entities 104 are associated, and the device type represented by the selected test probes 104. Alternatively, the test probes 104 included in a set of test probes 104 for a particular test can be selected to model or represent different system 100 loads or configurations. For example, embodiments of the present invention permit test parameters to be selected that involve particular portions of different types of network entities 104. That is, embodiments of the present invention permit network entities 104 to be distinguished based on device type.

At step 532, performance tests using the selected set can be run, and test results can be collected. The test results may then be reported, for example in real time, or test results can be collected for later viewing or use (step 536). Although the process is shown as ending after completion of the reporting or collection of test results, it should be appreciated that the overall process illustrated in FIG. 5 may be ongoing. For example, the results of performance tests can be analyzed and/or reported, and results of any analysis may be used to modify the entities accepted for registration and/or the selection of test probes for use in additional performance tests. In addition, various of the steps included in the process may be performed continuously, and various of the steps need not be performed in the order illustrated. For example, steps associated with selecting test probes, running tests, collecting test results and reporting those results may be performed continuously, and may be performed concurrently with steps associated with registering network probes with a network monitor.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for obtaining information regarding a network, comprising:
    populating a network with a plurality of test probes;
    providing a network monitor, wherein said network monitor is associated with an address;
    providing said address of said network monitor to test probes included in said plurality of test probes;
    in response to receiving said address of said network monitor, said test probes included in said plurality of test probes sending a registration request to said network monitor;
    in response to receiving said registration requests, registering at least some of said test probes, wherein said registering includes:
        collecting an Internet protocol address of a network entity associated with a test probe;
        collecting a network mask associated with said network entity;
        collecting network topology information, including information regarding network entity attributes and distributions of first and second network entity types;
    determining a distribution of said first network entity type and determining a distribution of said second network entity type from said collected network topology information;
    categorizing said at least some of said test probes, wherein said categorization includes categorizing said at least some of said test probes as to type of entity associated with a test probe, wherein said categorization of said at least some of said test probes results in a first distribution of test probes that models one of: 1) an actual distribution of types of network entities; or 2) a potential distribution of types of network entities.

2. The method of claim 1, wherein said categorizing further includes categorizing said at least some of said test probes as to number of network hops from said network monitor.

3. The method of claim 2, wherein said network monitor comprises application programming running on at least a first network entity operable to perform said registering and categorizing.

4. The method of claim 1, further comprising:
selecting at least a first test probe associated with a first entity type as part of a test probe set;
selecting at least a second test probe associated with a second entity type as part of said test probe set.

5. The method of claim 1, wherein said first distribution of test probes models an actual distribution of types of network entities.

6. The method of claim 5, wherein said model distribution is selected by a user controlling aspects of the operation of said network monitor.

7. The method of claim 6, wherein said model distribution is determined with reference to a map containing information related to an actual distribution of network entities in a network.

8. The method of claim 1, further comprising:
determining a distribution of sub networks represented by said registered test probes;
selecting at least one test probe associated with a first sub network;
selecting at least one test probe associated with a second sub network, wherein said selecting is performed to obtain a distribution that models said determined distribution.

9. The method of claim 8, wherein said model distribution contains a fraction of a total number of registered test probes.

10. The method of claim 9, wherein said model distribution is determined with reference to a map containing information related to an actual distribution of network entities in a network.

11. The method of claim 1, further comprising:
maintaining a record of each registered test probe, wherein said record comprises a network map.

12. The method of claim 1, further comprising:
generating a converged network identifier for each registered test probe, wherein for each registered test probe said converged network identifier includes:
a) a representation of a sub network in which said network entity is included; and
b) a representation of a device type associated with said test probe.

13. The method of claim 1, further comprising:
inserting a network analyzer in said network, wherein said network monitor is assigned a network address;
notifying said test probes of said network address of said network monitor, wherein each notified test probe sends a request to register to said network monitor.

14. The method of claim 13, further comprising:
instructing said registered test probes to run network test procedures.

15. The method of claim 14, wherein said instructing includes sending from said network monitor an instruction to each registered test probe to run network test procedures.

16. A system for collecting information related to a network, comprising:
a plurality of network entities, wherein each of said network entities is associated with a network address and a device type, and wherein each of said network entities comprises a test probe;
a network analyzer capable of communicating with said test probes over said network, said network analyzer including:
memory, wherein information from each test probe related to said network address and an entity type of a network entity associated with each test probe is stored, wherein said network analyzer receives said information from said test probes as part of a registration request made by said test probes to said network analyzer, wherein said test probes issue registration requests in response to receiving an address of said network analyzer, wherein in response to receiving information from said test probes as part of a registration request at least some of said test probes are registered, wherein said registering includes:
collecting an Internet protocol address of a network entity included in the plurality of network entities that each comprise a test probe from which a registration request is received;
collecting a network mask associated with said network entity;
collecting network topology information, including information regarding network entity attributes and distributions of first and second network entity types, wherein a distribution of said first network entity type is determined and a distribution of said second network entity type is determined from said collected network topology information, wherein at least some of said test probes are categorized, wherein said categorization includes categorizing said at least some of said test probes as to type of entity associated with a test probe, wherein said categorization of said at least some of said test probes results in a first distribution of test probes that models one of: 1) an actual distribution of types of network entities; or 2) a potential distribution of types of network entities.

17. The system of claim 16, further comprising:
at least a first network router, wherein said at least a first network router defines at least two sub networks.

18. The system of claim 16, wherein an entity type of at least one of said network entities is a communication endpoint.

19. The system of claim 18, wherein said communication endpoint is a telephone associated with at least a network address and an extension number.

20. The system of claim 16, wherein an entity type of at least one of said network entities is a gateway associated with a network address and one of an extension range and a network region.

21. The system of claim 16, wherein an entity type of at least one of said network entities is a router associated with a network address and a default gateway.

22. The system of claim 16, wherein an entity type of at least one of said network entities is a layer 3 switch associated with a network address and a default gateway.

23. The system of claim 16, further comprising an administration device in communication with said network analyzer over said network, wherein control commands are provided from said administration device to said network analyzer, and wherein information collected from said network entities is provided from said network analyzer to said administration device.

24. A system for collecting information related to a network, comprising:
means for performing functions, wherein network traffic is generated on said network as a result of performance of at least some of said functions;
means for generating test traffic on said means for performing functions; and means for collecting information from said means for generating test traffic, said information including network address information and a type associated with a means for performing functions associated with each means for generating test traffic, wherein said information from said means for generating test traffic is received by said means for collecting information in response to registration requests that are generated by said means for generating test traffic in response to providing said means for generating test traffic with an address of said means for collecting information, wherein in response to receiving information from said means for generating test traffic at least some of said means for generating test traffic are registered, wherein said registering includes:

collecting a network mask associated with a means for performing functions;

collecting an Internet protocol address of a means for performing functions on which a means for generating test traffic from which a registration request is received is operating;

collecting network topology information, including information regarding attributes and distributions of first and second means for performing functions, wherein a distribution of said first means for performing functions is determined and a distribution of said second means for performing functions is determined from said collected network topology information, wherein at least some of said means for generating test traffic are categorized, wherein said categorization includes categorizing said at least some of said means for generating test traffic as to type of means for performing functions associated with a means for generating test traffic, wherein said categorization of said at least some of said means for generating test traffic results in a first distribution of means for generating test traffic that models one of: 1) an actual distribution of types of means for performing functions; or 2) a potential distribution of types of means for performing functions.

25. The system of claim 24, further comprising:

means for storing information collected by said means for collecting information.

26. The system of claim 24, further comprising:

means for comparing characteristics of said collected information to model characteristics.

27. The system of claim 26, wherein said model characteristics are derived from information related to an actual distribution of types associated with means for performing functions in said network.

28. The system of claim 24, further comprising:

means for administering said means for collecting information.

29. The system of claim 28, wherein model characteristics are selected by an administrator operating said means for administering said means for collecting information.

30. The system of claim 28, wherein said means for administering said means for collecting information is interconnected to said means for collecting information by said network.

31. The system of claim 24, wherein a plurality of means for collecting information are provided.

* * * * *